United States Patent
Trapp

(10) Patent No.: US 10,205,834 B2
(45) Date of Patent: Feb. 12, 2019

(54) GLOBAL LOCAL NUMBER

(71) Applicant: tyntec Group Limited, London (GB)

(72) Inventor: Thorsten Trapp, Hagen (DE)

(73) Assignee: Tyntec Group Limited, London (GB)

(*) Notice: Subject to any disclaimer, the term of this patent is extended or adjusted under 35 U.S.C. 154(b) by 108 days.

(21) Appl. No.: 15/170,990

(22) Filed: Jun. 2, 2016

(65) Prior Publication Data

US 2016/0277591 A1 Sep. 22, 2016

Related U.S. Application Data

(63) Continuation of application No. 13/826,990, filed on Mar. 14, 2013.

(51) Int. Cl.
*H04W 4/24* (2018.01)
*H04L 29/12* (2006.01)
*H04M 15/00* (2006.01)

(52) U.S. Cl.
CPC ...... *H04M 15/8061* (2013.01); *H04L 61/605* (2013.01); *H04M 15/50* (2013.01); *H04M 15/56* (2013.01); *H04M 15/70* (2013.01); *H04M 15/72* (2013.01); *H04M 15/745* (2013.01); *H04M 15/80* (2013.01); *H04M 15/856* (2013.01); *H04W 4/24* (2013.01); *H04M 2215/32* (2013.01)

(58) Field of Classification Search
CPC ............. H04M 15/56; H04M 15/8061; H04M 15/856; H04M 15/50; H04M 15/70; H04M 15/72; H04M 15/745; H04M 15/80; H04L 61/605; H04W 4/24
See application file for complete search history.

(56) References Cited

U.S. PATENT DOCUMENTS

| | | | |
|---|---|---|---|
| 2004/0218748 A1* | 11/2004 | Fisher | H04L 12/66 379/221.01 |
| 2005/0265322 A1 | 12/2005 | Hester | |

FOREIGN PATENT DOCUMENTS

DE    10121705 A1    11/2002

OTHER PUBLICATIONS

"International Networks (country code)," the Feb. 18, 2012 revision of the Wikipedia article of the same name, available at https://en.wikipedia.org/w/index.php?title=International_Networks_(country_code)&oldid=477572719 (Year: 2012).*

(Continued)

*Primary Examiner* — David Orange
(74) *Attorney, Agent, or Firm* — Mendelsohn Dunleavy, P.C.; Steve Mendelsohn

(57) ABSTRACT

A system and method provides communication between subscribers of a telephone network and the subscribers of an OTT provider website wherein each of the subscribers of the OTT provider website is assigned a telephone number in a block which is not assigned to any particular country. The system includes terminating a call (e.g., having voice, video, data, and/or messaging) from the telephone network directed to a number in the block, and passing the terminated call to a nearby entry point to the OTT provider website, the OTT website being configured to associate the incoming call with the user's account to which the called number has been assigned. Calls can be placed in the opposite direction, in which case the assigned number is passed into the telephone system as the calling party's number.

16 Claims, 3 Drawing Sheets

(56) References Cited

OTHER PUBLICATIONS

"From clouds to a clear sky: OTT/ cloud telephony for operators and internet players" published by Tyntec on Mar. 6, 2012 at http://www.slideshare.net/tyntec/ott-cloud-telephony-for-operators-and-internet-players (Year: 2012).*
"Inum Supports UN Disaster Relief Efforts and your VoIP Provider," Chloe Mulliner, iNum blog, Dec. 21, 2012 available at http://www.inum.net/inum-supports-un-disaster-relief-efforts-and-your-voip-provider/ (Year: 2012).*
"The Rise of the iNum (international Number)" Jackson Weber, Jun. 13, 2012, VoIP Review blog, available at https://www.voipreview.org/blog/rise-inum-international-number (Year: 2012).*
"iNum lives!" iNum blog, Mar. 6, 2015, available at http://www.inum.net/inum-lives/ (Year: 2015).*
Weber, J. "The Rise of the iNum (international Number)," VOIP Review, Jun. 13, 2012; as retrieved from: https://www.voipreview.org/blog/rise-inum-international-number; 5 pages.
Transcript of interview with Thorsten Trapp conducted on Mar. 8, 2012, recorded online at https://youtu.be/pFe1GEXqw5k.
Bernier, P., "TMC, Internet Telephony Congratulate IT Product of the Year Award Winners," Feb. 1, 2011, retrieved from: http://www.tmcnet.com/voip/features/articles/152668-tmc-internet-telephony-congratulate-it-product-the-year.htm.

\* cited by examiner

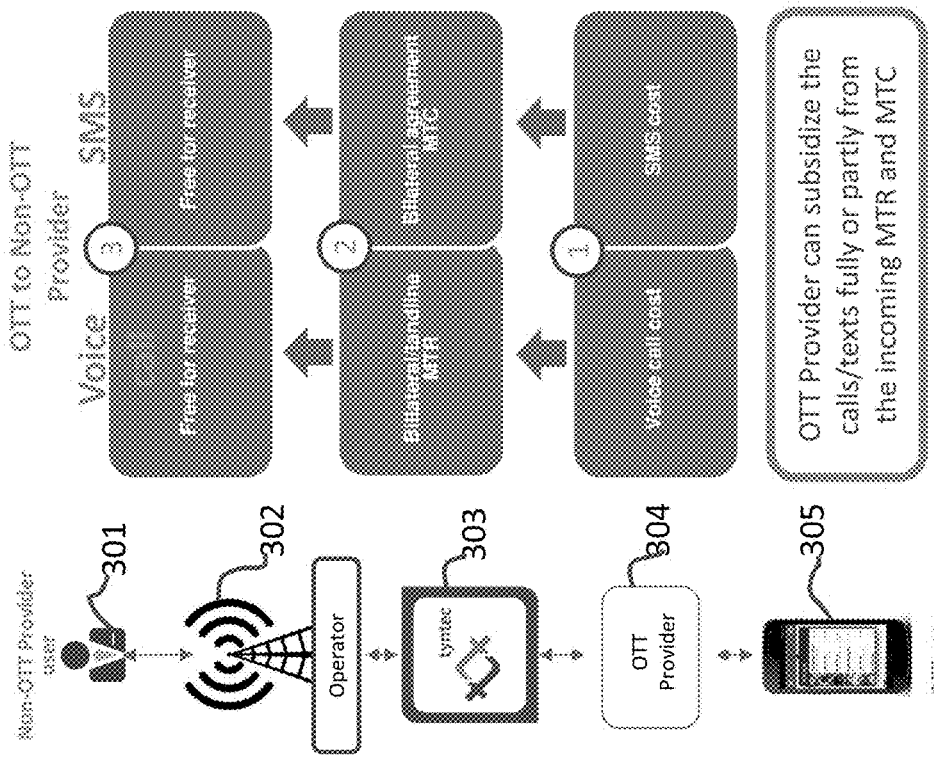
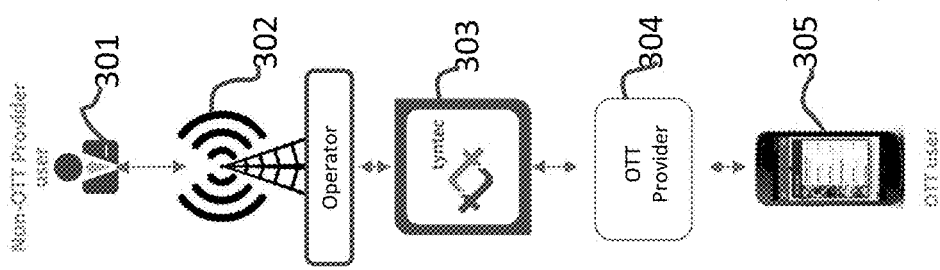
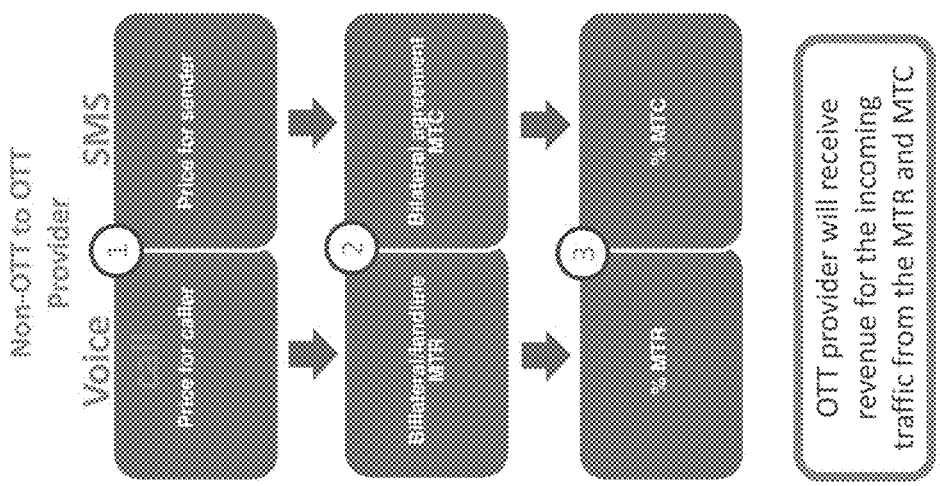

GLOBAL LOCAL NUMBER

CROSS-REFERENCE TO RELATED APPLICATIONS

This is a continuation of co-pending application Ser. No. 13/826,990, filed on Mar. 14, 2013, the teachings of which are incorporated herein by reference in their entirety.

TECHNICAL FIELD

The present invention relates to communication, particularly telephone communication including also SMS (short message service) and mobile call (cell phone) and video communication.

BACKGROUND

Current telephone communication is priced according to the geographical distance over which the call extends. Historically, this was due to the fact that more cable was needed to connect subscribers that were further apart than to connect subscribers that were close together. With increased mobility of subscribers and widespread use of high-speed long-distance trunk connections, this model is no longer desirable, nor does it reflect the true cost of providing the connection. One particular inconvenience is the fact that a call to the same subscriber would be charged at different rates according to where that calling subscriber happens to be. If the caller is calling from a mobile connection, there can be a large variation in the cost of the call depending on which country they are in and which provider they are using for the mobile connection. There currently exist providers of Voice over IP (VoIP) telephone services, whereby a user can make and receive calls to and from an assigned number, whereby the call is routed wholly by the Internet rather than via the normal telephone network.

There also exist so-called Over-the-Top (OTT) providers, including but not limited to social networks and online dating services, who offer a networking service via the Internet. Text messages and photographs are commonly transmitted via such services. Examples of such providers are the social networking sites such as Facebook, G+/GoogleTalk, Skype, and the dating sites. These providers have substantial infrastructures.

SUMMARY

Certain embodiments of the present invention achieve uniformity in call charging and, preferably, with all calls being charged at local rates, i.e., charged at common domestic rates, local to the caller.

According to a first aspect herein described, certain embodiments of the present invention provide a method of providing communication between a subscriber within a telephone network and a user of an OTT provider website. The telephone network can be a fixed line or a mobile, and the communication can be voice, video, or SMS or other messaging service. The OTT provider website can be a social networking site such as Facebook, G+, draugiem.lv, or it may alternatively be a dating website or any other OTT player that needs to connect to classical telephony services like pinger, gogii/textplus.

In the examples below, Facebook™ is taken as an example of an OTT provider, this being a social networking website. The invention, however, is readily applicable to any of the hundreds of other social and dating websites accessible via the Internet.

Certain embodiments of the invention include providing a block of one or more telephone numbers in international format and assigning individual numbers of that block to users of the OTT provider website. In the example described in more detail below, the international telephone numbers are in the number range +882, this being an example of a number in international format and which has not been assigned to a particular country. Assignment of blocks of numbers is handled by the International Telecommunication Standardization Bureau under regulation ITU-T E.164. A call originating from the telephone network and directed to a number in the provided block is terminated at entry points to the OTT provider's website/infrastructure, which are nearest to the caller. For the originating telecommunications provider, costs are set by the owner of the numbering resource between zero in the interworking agreement with domestic fixed line termination rates. This should result in the call being charged at local/domestic rates to the caller. Such inter-working agreements are common between telephony providers. Once the call or communication is within the OTT provider's website/infrastructure, it is directed to the user to which the called number has been assigned. If this specific number block has similar commercial agreements with fixed and especially mobile carriers around the world, then the same ITU-T E.164 address is reachable at low/domestic rates from all partner networks, which creates a global local number.

The result of this method is that a call can be placed to a number in the said block and is always charged at local rates.

The method can optionally further include the step of initiating a call within a user's webpage on the OTT provider's site, the call being directed to a subscriber member within the telephone network. In this case, the call would be forwarded within the OTT provider's infrastructure to an exit point domestic to the subscriber on the telephone network. By domestic, again it is meant that the exit point is either on the same network or on another network, which is linked by an inter-working agreement so that the cost of the call from the OTT provider's exit point to the subscriber on the telephone network is the cost of a local call. If the OTT provider does not have an exit point within local or inter-working networks, then an exit point is selected to minimize the call cost. As the call emerges from the OTT provider's network, it is identified as originating from the individual number assigned to the user of the OTT provider. Thus, in the example set out in greater detail below, a call initiated from a user's webpage would be identified in the telephone network as originating from a +882 number, enabling the called party to return the call by placing a new call back into the OTT provider's network.

The SMS interworking is handled via mobile signaling protocols, such as but not limited to SCCP (signaling connection control part), SIGTRAN (signaling transport over IP), XMPP (extensible messaging and presence protocol), and SMPP (short message peer-to-peer protocol). The international standard is MAP (mobile application part), either on an IP or SS7 based bearer. Especially for mobile networks, SMS messages are exchanged on a bilateral agreement basis. The preferred embodiment to implement worldwide SMS bilateral, symmetrical agreements is mobile signaling. For that, STP (signal transfer point) and HLR/MSC/VLR (home location register/messaging service center/visitor location register) entities inside the ITU-T E.164 range are implemented.

Certain embodiments of the invention also include the infrastructure and agreements necessary to implement the above-described methods.

BRIEF DESCRIPTION OF THE DRAWINGS

Embodiments of the invention will now be described by way of example only, making reference to the following drawings, in which:

FIG. 3a shows economic aspects of the placing of a Voice Call or an SMS from a non-OTT provider user to an OTT provider user;

FIG. 3b illustrates the placing of a call from a non-OTT provider user to an OTT provider user; and FIG. 3c shows economic aspects of the placing of a call from an OTT provider user to a non-OTT provider user.

DETAILED DESCRIPTION OF PREFERRED EMBODIMENTS

In the description that follows, the over-the-top (OTT) provider http://en.wikipedia.org/wiki/Telco-OTT, taken as illustrative for the purpose of this explanation, could be Facebook™. The invention, however, is not restricted to that particular social networking website and can be applied to any of many hundreds of social networking and dating websites. A full list of social networking websites can be obtained on Wikipedia at http://en.wikipedia.org/wiki/list_of_social_networking_websites and is included herein by reference. In the present embodiment, different Facebook users are assigned unique numbers selected from a block of telephone numbers in international format. In the example shown in FIG. 1, the user has been assigned the phone number +882460123456789. This number belongs to the block +88246 which, in this example, is assigned to users of various social networking websites. Some of the digits of the number could indicate which social networking website it belongs to.

Figure 1:
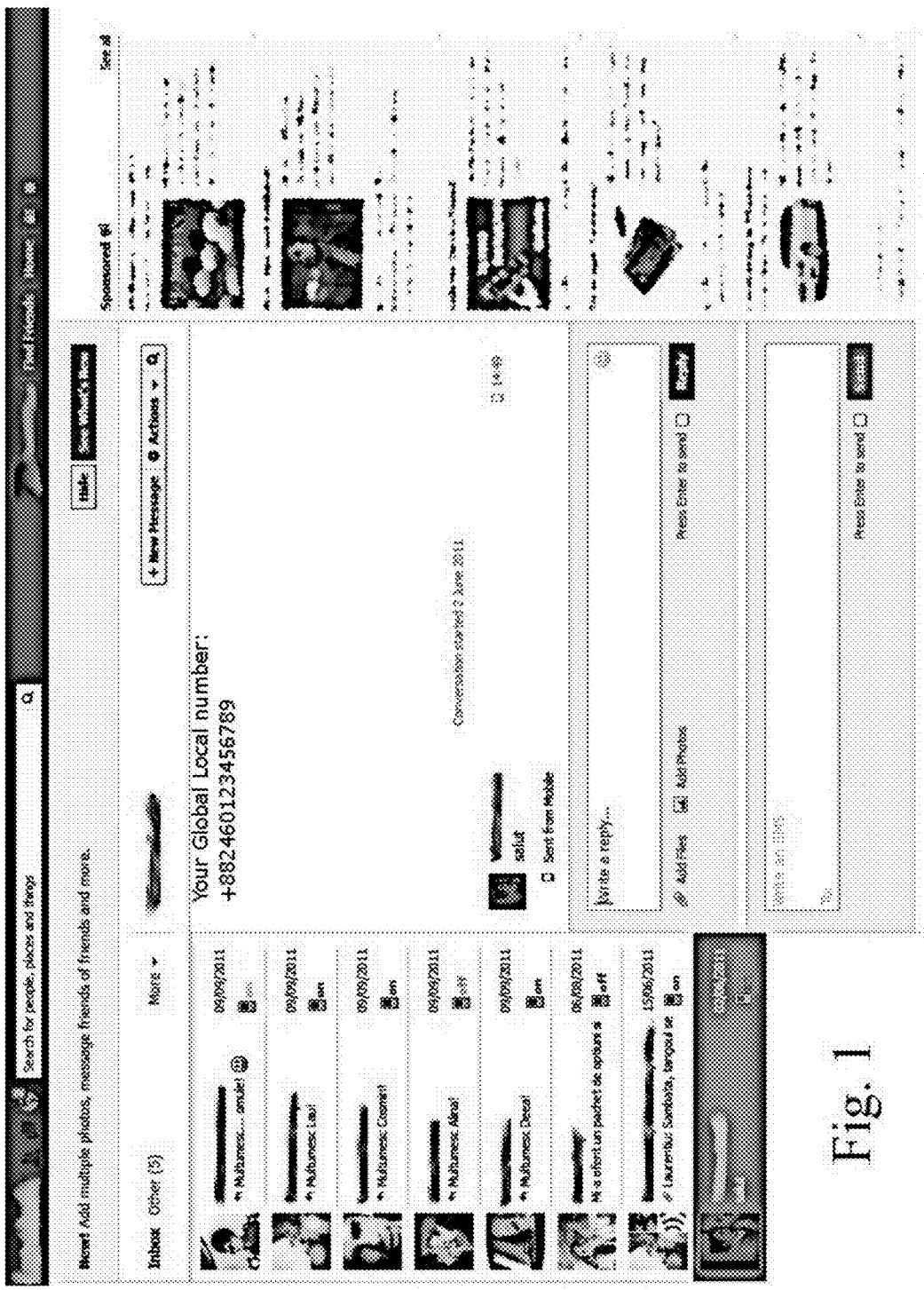
FIG. 1 shows a screen shot of a user's page on the OTT provider's website including features provided for by one embodiment of the present invention.

Referring to FIG. 1, on the left-hand side of the page can be seen indicia signifying the arrival of messages in an inbox. Each one has an icon indicating whether the mobile telephone for that particular user is "OFF" or "ON". Thus, if the OTT user wishes to call that person, all that is necessary is to click on the "on" link, and the user's communication device, computer tablet, or mobile telephone will then connect, typically via a SIP (session initiation protocol) connection, to the user originating the message. The ON/OFF indication is derived (i) from whether the other user is logged into the OTT provider in the case of messages only within the OTT provider system or (ii) from information supplied via the mobile network in other cases. It may be that such information is not available in the case of callers from a telephone network.

The following advantages become immediately apparent:

(a) OTT provider website messages, texts, and notes of voice calls are all in one inbox.

(b) Each friend/user has one number, which makes it easy to remember that number.

(c) Each user is assigned a single number, and users can call each other without charge.

Figure 2:
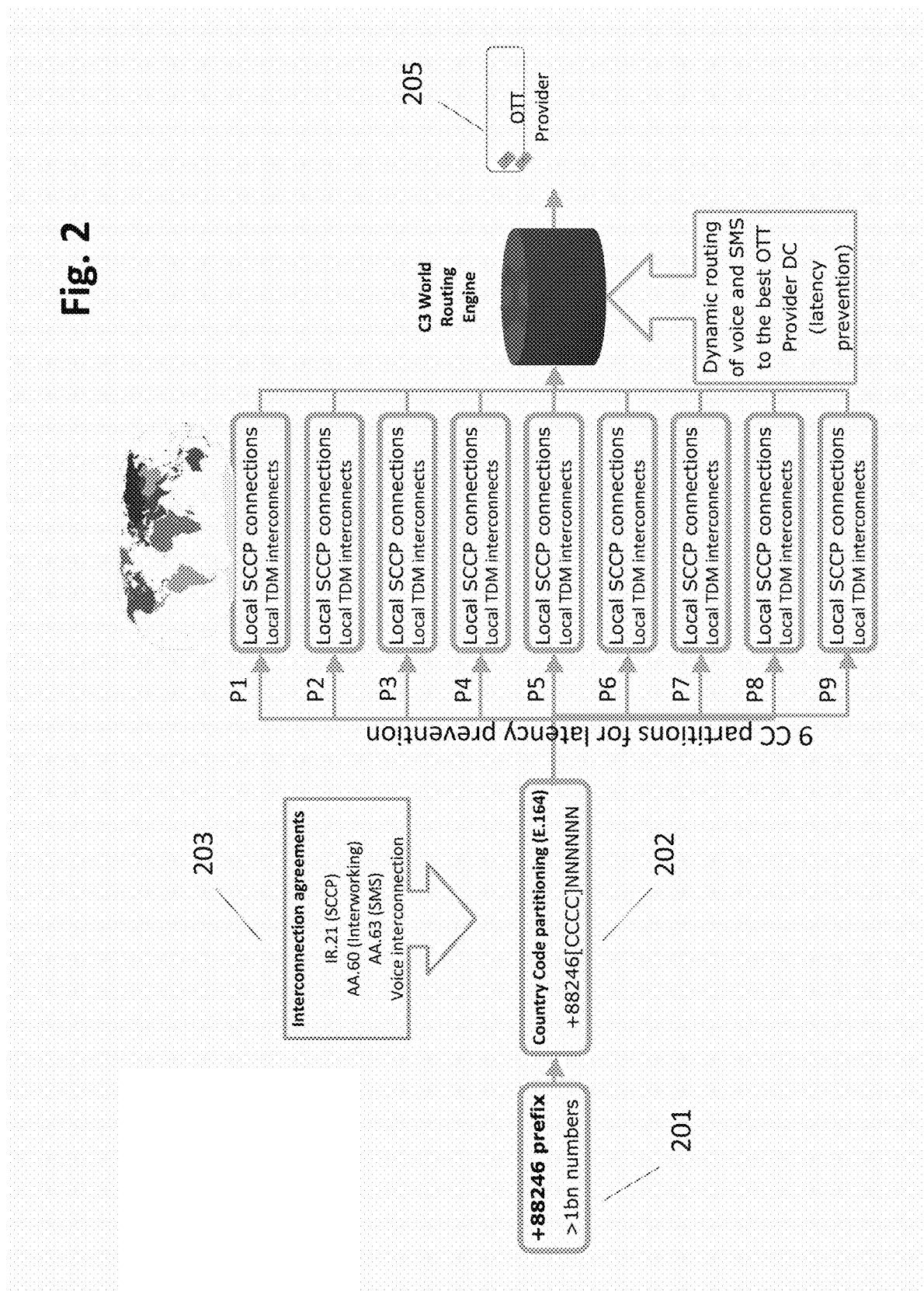
FIG. 2 is a schematic diagram of the service architecture for providing a communication from a telephone network to an OTT provider user.

Referring to FIG. 2, there is shown an example of a service architecture, which has an optional provision to help reduce latency. Latency is the delay in the transmission of data representing particularly speech and gives rise to an annoying and late echo, which is difficult to cancel. It also can disrupt data communication. Numbers assigned to OTT users in the present example are given the +88246 prefix, as shown at box 201 in FIG. 2. This allows for an excess of 1 billion numbers. To help reduce latency, the numbers can be further divided according to geographic areas by incorporating country codes in the first four digits following the +88246 position in the number, as shown at box 202 in FIG. 2. Interconnection agreements are secured with local providers to ensure that any number with a +88246 prefix is routed to an appropriate local OTT provider website entry point with the subscriber paying only a local charge. In FIG. 2, nine different paths are shown, P1 to P9. The communication enters an OTT network where it is directed to the number associated therewith.

Operator Management Processes
  Interconnection Agreement
  P1-P9 interconnect
  P1-P9 SCCP connection
  Interworking partner acquisition: mobile and landline (potentially hundreds in some countries)
  Billing/Invoicing
  Collect SMS/voice data in P1-P9 and do:
  Clearing via TAPS (transferred account procedure, version no. 3) GSMA (groupe speciale mobile association) procedure (TADIG (transferred account data interchange group)), or
  Clearing via special tyntec/MNO (mobile network operator) agreed process, where tyntec refers to tyntec Ltd. of the Isle of Man.
  O&M (Operations and Maintenance) of Global Network/
Continuous Quality Management
  IR testing procedure for ITU-T Global Local Numbers whenever new IR.21 documents are released
  Run network tests and do P1-P9 data build FIGS. 3a to 3c show examples of the economic and physical aspects of the connection of OTT and non-OTT users. In FIG. 3a, a non-OTT user places a call to an OTT user. This would be done by calling the OTT user's assigned number. This is +882460123456789 in the FIG. 1 example. The charge to the caller would typically be 0.015 dollars per minute, assuming a mobile termination rate (MTR) of 0.01 dollars per minute. The mobile termination procedure will be conducted by the OTT entry point, and the OTT provider will typically receive a proportion of the revenue for the incoming traffic from the MTR and the MTC (mobile termination charge). Once within the OTT provider website, the call will be routed to the OTT user who has that particular assigned international number.

FIG. 3b shows the path of a call from a non-OTT user 301 of a mobile network operator 302 via interface network 303 at the entry point to the OTT provider's website. Interface network 303 would typically be provided by a specialist provider of telecommunication infrastructure such as Tyntec of Douglas, Isle of Man. The telecommunication infrastructure provider also would typically run a full mobile care network, and/or announce the number range in the worldwide signaling network. Once the call is terminated within the telephone system, it is passed to the OTT infrastructure 304 and to a user's handset 305, where the call is received as a Voice over IP (VoIP) call, for example, by the SIP protocol.

FIG. 3c shows a call placed from an OTT provider website user to a non-OTT user. Typically, an OTT provider website or a sub-contractor handling the OTT telecommunication "out" interface will negotiate with telecommunications providers to allow all calls within their area to be treated as local calls, for example, costing 0.01 dollars per minute. The costs will be charged to the OTT provider, a cost that possibly could be passed on to the OTT user. Alternatively, such calls could be subsidized from calls/texts fully or partly from the incoming MTR and MTC fees. Thus, the OTT user pays either nothing or an amount corresponding to a local call.

In one embodiment, the invention is a method for providing communications between (i) subscribers of a plurality of telephone networks in a plurality of geographical areas and (ii) TP users of a telecommunications provider (TP) network (e.g., an OTT network or other suitable telecommunications provider). Telephone numbers in a block of telephone numbers in international format are assigned to the TP users. Arrangements are made for each telephone network to process telephone calls (e.g., fixed-line and/or mobile calls comprising voice, video, data, and/or messaging) from its subscribers to TP users as domestic calls (e.g., relatively inexpensive or free local calls), independent of the geographical location of the TP users.

FIG. 3b represents an exemplary communication provided by this method in which a first subscriber 301 of a first telephone network 302 in a first geographical area initiates a telephone call to a first TP user 305. The telephone call from the first subscriber 301 is routed by the first telephone network 302 to a telephone/TP interface network 303 as a domestic call based on the previously established arrangement between the first telephone network 302 and the interface network 303. The interface network 303 converts the telephone call into a TP call (e.g., a VoIP call) and routes the TP call to the TP network 304, which routes the TP call to the TP user 305.

Depending on the implementation, the interface network 303 may have first and second interface nodes respectively located in the first and second geographical areas and/or the TP network 304 may have first and second TP nodes respectively located in the first and second geographical areas. In one possible calling situation, the first telephone network subscriber may be in the first geographical area, while the TP user is in the second geographical area.

According to one possible routing scenario for that situation, (1) the telephone network routes the telephone call to the first interface node in the first geographical area, (2) the interface network routes the TP call to the first TP node in the first geographical area, (3) the TP network routes the TP call from the first TP node in the first geographical area to the second TP node in the second geographical area, and (4) the TP network routes the TP call from the second TP node in the second geographical area to the TP user.

According to another possible routing scenario for that same situation, (1) the telephone network routes the telephone call to the first interface node in the first geographical area, (2) the interface network routes the TP call from the first interface node in the first geographical area to the second interface node in the second geographical area, (3) the interface network routes the TP call from the second interface node in the second geographical area to the second TP node in the second geographical area, and (4) the TP network routes the TP call from the second TP node in the second geographical area to the TP user.

To summarize the philosophy behind the arrangements described above, an inbound call is really low cost for the calling carrier corresponding, for example, to fixed-line local costs. SMSs could also be handled with bilateral agreements, and inbound SMSs are also charged at local rates. The numbers assigned to the OTT provider/social network website is part of a global number range and, therefore, the local costs associated with the placing of a call to one of those numbers comprises only the cost of a local call in that country. There are no international charges, because the interworking and bilateral agreements are designed for local/domestic costs between the interworking partner network and the global local number range owner.

Agreements are made concerning pricing (local and in-bundles) with mobile network operators and other fixed-line carriers around the world. Greater priority is placed on mobile operators, as this is the area where costs can otherwise be very high. If any carriers do not abide by the agreements or if they charge their customers high prices for routing calls within the said international number range, they can be blocked at the discretion of the OTT provider. This can be judged blocked on the basis of the originating telephone number or on the basis of network information provided in the communication protocols.

An announcement "Blocked by xxx . . . " can be played by the terminating party without costs to the caller.

The advantage to the user is clear, and the number associated with their social network account (or other OTT provider) means that wherever they live, they can pick up their local mobile telephone and call a social network user on +88246XXXXXXXX without costs any different from a local mobile call. The same applies to SMS. The provider to whom the international format numbers have been assigned is essentially acting as a mobile carrier internationally providing virtual numbers with inter-working no SIM but all core network entities like HLR/HSS (home location register/home subscriber server), MGW (media gateway), and IMSI (international mobile subscriber identity) (ITU-T E.212 recommendation). http://en.wikipedia.org/wiki/International_mobile_subscriber_identity, no spectrum and no roaming. The virtual numbers are internationally common with satellite networks, but, in contrast to every other country code (ITU-T E.164 recommendation), they are local in every country with the agreements and interworking described here.

Having thus described embodiments of the invention, it should be apparent that various modifications and changes can be made without departing from the spirit and scope of the present invention.

The invention claimed is:

1. A method for providing communications between (i) subscribers of a plurality of telephone networks in a plurality of geographical areas and (ii) TP users of a telecommunications provider (TP) network, the method comprising:
   (a) assigning telephone numbers in a block of one or more telephone numbers in international format to the TP users, wherein the telephone numbers in international format are without a country assignment; and
   (b) arranging for each telephone network to process telephone-network calls from its subscribers to TP users as domestic calls, independent of the geographical area in which the TP users are located, wherein:
   when a first subscriber of a first telephone network in a first geographical area makes a first-telephone-network call to a first TP user:
      the first-telephone-network call from the first subscriber is routed by the first telephone network to a telephone/TP interface network as a domestic call;

the interface network converts the first-telephone-network call into a TP call and routes the TP call to the TP network; and the TP network routes the TP call to the TP user;

the interface network determines whether a second telephone network charges a second subscriber at a non-domestic rate or a domestic rate for second-telephone-network calls made by the second subscriber, where the non-domestic rate is higher than the domestic rate;

the interface network determines that the second telephone network charges the second subscriber at the higher non-domestic rate, and then the interface network prevents an incoming second-telephone-network call from the second subscriber from being routed as a TP call to the TP network; and for any incoming telephone-network call, the interface network can only either (i) reject the incoming telephone-network call or (ii) convert the incoming telephone-network call into a TP call and route the TP call to the TP network.

2. The method of claim 1, wherein:

the interface network has a first interface node in the first geographical area;

the TP network has a first TP node in the first geographical area and a second TP node in a second geographical area different from the first geographical area; and when the TP user is in the second geographical area:
the telephone network routes the first-telephone-network call to the first interface node in the first geographical area;
the interface network routes the TP call to the first TP node in the first geographical area;
the TP network routes the TP call from the first TP node in the first geographical area to the second TP node in the second geographical area; and
the TP network routes the TP call from the second TP node in the second geographical area to the TP user.

3. The method of claim 1, wherein:

the interface network has a first interface node in the first geographical area and a second interface node in a second geographical area different from the first geographical area;

the TP network has a TP node in the second geographical area; and when the TP user is in the second geographical area:
the telephone network routes the first-telephone-network call to the first interface node in the first geographical area;
the interface network routes the TP call from the first interface node in the first geographical area to the second interface node in the second geographical area;
the interface network routes the TP call from the second interface node in the second geographical area to the TP node in the second geographical area; and
the TP network routes the TP call from the TP node in the second geographical area to the TP user.

4. The method of claim 1, wherein the TP call is a VoIP call.

5. The method of claim 1, wherein the domestic call is a local call.

6. The method of claim 1, wherein the first-telephone-network call comprises one or more of voice, video, data, and messaging.

7. The method of claim 1, wherein the TP network is an over-the-top (OTT) network.

8. The method of claim 1, wherein the interface network determines that the second telephone network charges the second subscriber at the higher non-domestic rate, and then the interface network transmits a message to the second subscriber informing the second subscriber that the incoming second-telephone-network call was blocked without any cost to the second subscriber.

9. The method of claim 1, wherein the interface network determines that the second telephone network charges the second subscriber at the higher non-domestic rate, and then the interface network prevents the incoming second-telephone-network call from the second subscriber from being routed as a TP call to the TP network at the discretion of the TP network.

10. The method of claim 1, wherein the telephone/TP interface network is nearest to the first subscriber.

11. The method of claim 1, wherein the first-telephone-network call from the first subscriber is connected at an entry point to the TP network nearest to the first subscriber.

12. The method of claim 1, wherein the telephone numbers in international format are assigned to one or more social networking websites without a country assignment.

13. The method of claim 1, wherein, for the first telephone network, costs are set by an interworking agreement between the first telephone network and the TP network such that the first-telephone-network call is charged at a local/domestic rate to the first subscriber independent of the geographical location of the first TP user.

14. The method of claim 13, wherein, for each of the plurality of telephone networks, costs are set by a corresponding interworking agreement between the telephone network and the TP network such that (i) any telephone-network call from any telephone-network subscriber to any TP user is charged at a corresponding local/domestic rate to the first subscriber independent of the geographical location of the TP user and (ii) any TP call from any TP user to any telephone-network subscriber is charged at a corresponding local/domestic rate to the TP user independent of the geographical location of the TP user.

15. The method of claim 14, wherein, if the TP network does not have an exit point within a local or inter-working telephone network, then, when a TP user places a TP call to a subscriber of the local or inter-working telephone network, the TP call is routed to an existing exit point of the TP network that minimizes call cost.

16. A method for providing communications between (i) subscribers of a plurality of telephone networks in a plurality of geographical areas and (ii) TP users of a telecommunications provider (TP) network, the method comprising:

(a) assigning telephone numbers in a block of one or more telephone numbers in international format to the TP users, wherein the telephone numbers in international format are without a country assignment; and (b) arranging for each telephone network to process telephone-network calls from its subscribers to TP users as domestic calls, independent of the geographical area in which the TP users are located, wherein:

when a first subscriber of a first telephone network in a first geographical area makes a first-telephone-network call to a first TP user:
the first-telephone-network call from the first subscriber is routed by the first telephone network to a telephone/TP interface network as a domestic call;
the interface network converts the first-telephone-network call into a TP call and routes the TP call to the TP network; and
the TP network routes the TP call to the TP user;

the interface network determines whether a second telephone network charges a second subscriber at a non-domestic rate or a domestic rate for second-telephone-network calls made by the second subscriber, where the non-domestic rate is higher than the domestic rate; and the interface network determines that the second telephone network charges the second subscriber at the higher non-domestic rate, the interface network prevents an incoming second-telephone-network call from the second subscriber from being routed as a TP call to the TP network, and the interface network transmits a message to the second subscriber informing the second subscriber that the incoming second-telephone-network call was blocked without any cost to the second subscriber.

* * * * *